United States Patent [19]

Yasue

[11] Patent Number: 4,538,026
[45] Date of Patent: Aug. 27, 1985

[54] LOOP BACK SYSTEM FOR LOOP TRANSMISSION LINE

[75] Inventor: Kazuo Yasue, Tokyo, Japan

[73] Assignee: NEC Corporation, Tokyo, Japan

[21] Appl. No.: 583,538

[22] Filed: Feb. 28, 1984

[30] Foreign Application Priority Data

Feb. 28, 1983 [JP] Japan ................................. 58-32291

[51] Int. Cl.³ ............................................ H04L 11/16
[52] U.S. Cl. .................... 178/2 R; 178/2 C; 178/2 D
[58] Field of Search .............. 178/63 F, 1, 2 R, 2 C, 178/2 D, 71 R, 70 R, 71 N; 370/14, 15, 16, 86, 87, 88; 455/4, 5, 601

[56] References Cited

U.S. PATENT DOCUMENTS 4,190,821  2/1980  Woodward .......................... 370/88
4,380,061  4/1983  Mori et al. .......................... 370/88

Primary Examiner—Stafford D. Schreyer
Attorney, Agent, or Firm—Sughrue, Mion, Zinn, Macpeak and Seas

[57] ABSTRACT

A loop back system for a loop transmission line allows the whole system to be looped back for addition or removal of a transmission device, without cutting off loops and in exactly the same manner as in ordinary data transfer. A plurality of transmission devices capable of generating loop-back commands are connected to an active loop and a backup loop. First one of the transmission devices transmits loop-back commands, while second and third ones individually receive the loop-back commands to connect their transmitter sides to both the active and backup loops. This sets up a loop-back condition in each of the transmission devices.

4 Claims, 5 Drawing Figures

LOOP BACK SYSTEM FOR LOOP TRANSMISSION LINE

BACKGROUND OF THE INVENTION

The present invention relates to a loop transmission line having a plurality of transmission devices which are connected to a pair of transmission loops, one being an active loop and the other, a backup loop. More particularly, the present invention is connected with a loop back system for switching the transmission loops from one to the other in response to a command sent out from one of the transmission devices.

A loop transmission system employs two independent loops which allow signals to flow therethrough in opposite directions to each other, taking into account possible failures in the transmission paths. Generally, when a failure occurs in one of the loops which is in operation, it is switched to the other loop to continue communications.

Thus, in the prior art system, major interest has been taken in failures in the transmission paths and not in the installation of additional nodes, removal of nodes, or the like.

An example of prior art systems of the type described is disclosed in "32 Mbps Optical Fiber Loop Network: H-8644", Hitachi Reviews, Vol. 31, No. 3, June 1982. In the disclosed system, when failures have occurred in both the active and backup loops, a loop service node (LSN), or master station, sends out a command for sequentially looping back remote field service nodes (FSN), or slave stations, to thereby cause the FSNs into loop back operation and, awaiting a return of a loop timing output from the LSN, locates a failure portion to set up a loop back path which excludes the failure portion. Such a system, therefore, requires the LSN to send out another command to the other LSNs in the opposite direction to loop them back, so that the whole system may be looped back. Also, each node has to be furnished with two different receiver circuits for receiving the commands, one for the active loop and the other for the backup loop.

For the above reasons, the prior art system concerned does not allow a loop to be additionally installed in or removed from the loops without temporarily cutting off the loops. This requires software or firmware countermeasures such as retry of messages at each node or momentary inhibition of transmission.

SUMMARY OF THE INVENTION

It is therefore an object of the present invention to provide a loop back system for a loop transmission line which eliminates the drawbacks inherent in the prior art loop back system and allows the whole system to be looped back in exactly the same manner as in ordinary data transfer without effecting usual communications, i.e., without cutting off the loops, while making installation of one receiver circuit for the active loop and another for the backup loop not always necessary.

It is another object of the present invention to provide a generally improved loop back system for a loop transmission line.

A loop back system for a loop transmission line of the present invention comprises an active loop and a backup loop which are paired for transmitting data, plurality of transmission devices each being connected to the active loop and the backup loop for generating a loop-back command, first loop-back command transmission means for causing first one of the transmission devices to transmit a first loop-back command to second one of the transmission devices which is connected to the active loop and to be looped back, the second transmission device located in the active loop, to which data is to be transmitted, downstream of and adjacent to the first transmission device, first loop-back means for looping back the second transmission device such that the second transmission device received the first loop-back command is turned back from the active loop to the backup loop while being kept is connection with the active loop, second loop-back command transmission means for causing the first transmission device to transmit a second loop-back command to third one of the transmission devices after the second transmission device is looped back by the first loop-back means, the third transmission device being located in the active loop downstream of and adjacent to the transmission device, and second loop-back means for looping back the third transmission device such that the third transmission device received the second loop-back command is turned back from the backup loop to the active loop.

The above and other objects, features and advantages of the present invention will become more apparent from the following detailed description taken with the accompanying drawing.

DESCRIPTION OF THE PREFERRED EMBODIMENT

While the loop back system for a loop transmission line of the present invention is susceptible of numerous physical embodiments, depending upon the environment and requirements of use, a substantial number of the herein shown and described embodiment have been made, tested and used, and all have performed in an eminently satisfactory manner.

Figure 1:
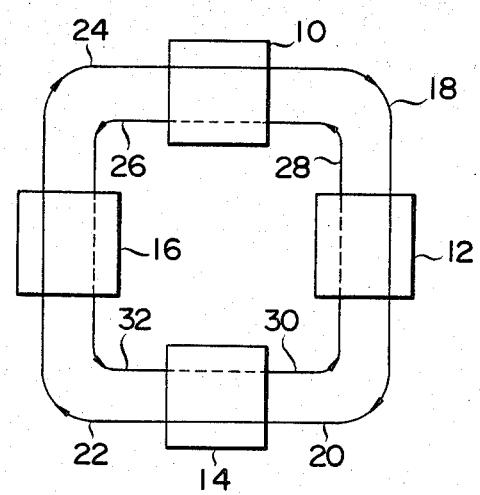
FIG. 1 is a diagram of a loop transmission line to which the present invention is applicable.

Referring to FIG. 1 of the drawing, a loop transmission system of line to which the present invention is applicable is shown and comprises transmission devices 10, 12, 14 and 16, a first transmission loop made up of paths 18, 20, 22 and 24, and a second transmission loop made up of paths 26, 28, 30 and 32. During a normal system operation, the first loop is used for data communication while the second loop is bypassed.

Figure 2:
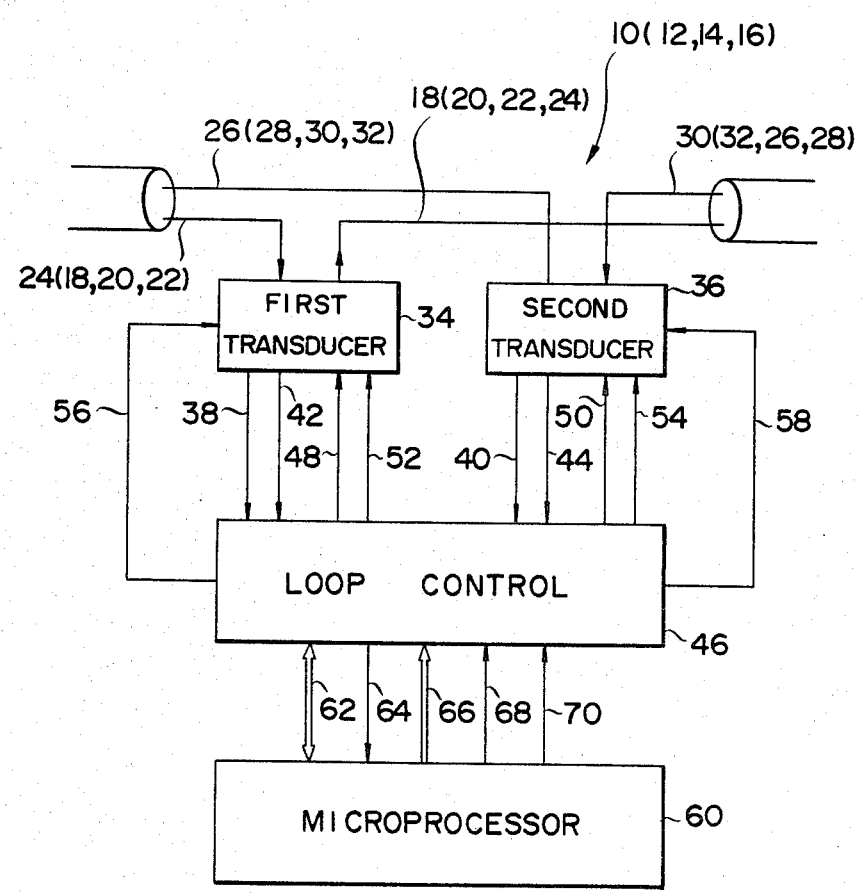
FIG. 2 is a block diagram of a loop back system embodying the present invention.

Referring to FIG. 2, each of the transmission devices 10, 12, 14 and 16 shown in FIG. 1 includes a first photoelectric transducer circuit 34 and a second photoelectric transducer circuit 36. Clock lines 38 and 40 respectively extend from the photoelectric transducers 34 and 36 to a loop control circuit 46, to supply it with clock pulses provided by photoelectric conversion. Also extending from the photoelectric transducers 34 and 36 to the loop control 46 are data lines 42 and 44 for the delivery of data. Clock lines 48 and 50 respectively extend from the loop control 46 to the first and second photoelectric transducers 34 and 36 in order to supply clock pulses which will be fed out to the transmission paths 18 and 26. Further, data lines 52 and 54 extend from the loop control 46 to the photoelectric transducers 34 and 36 to supply data which will be fed out to the transmission paths 18 and 26. The loop control 46 controls the photoelectric transducers 34 and 36 independently of each other by supplying control signals over control lines 56 and 58. The device also includes a processor 60 for microprogram control which is interconnected with the loop control 46 by a data bus 62. An interrupt line 64 extends from the loop control 46 to the processor 60. A bunch of lines 66 extend from the processor 60 to the loop control 46 in order to control it. A write pulse line 68 extends from the processor 60 to the loop control 46 for supplying write pulses thereto. A clock line 70 is used by the loop control 46.

Figure 3:
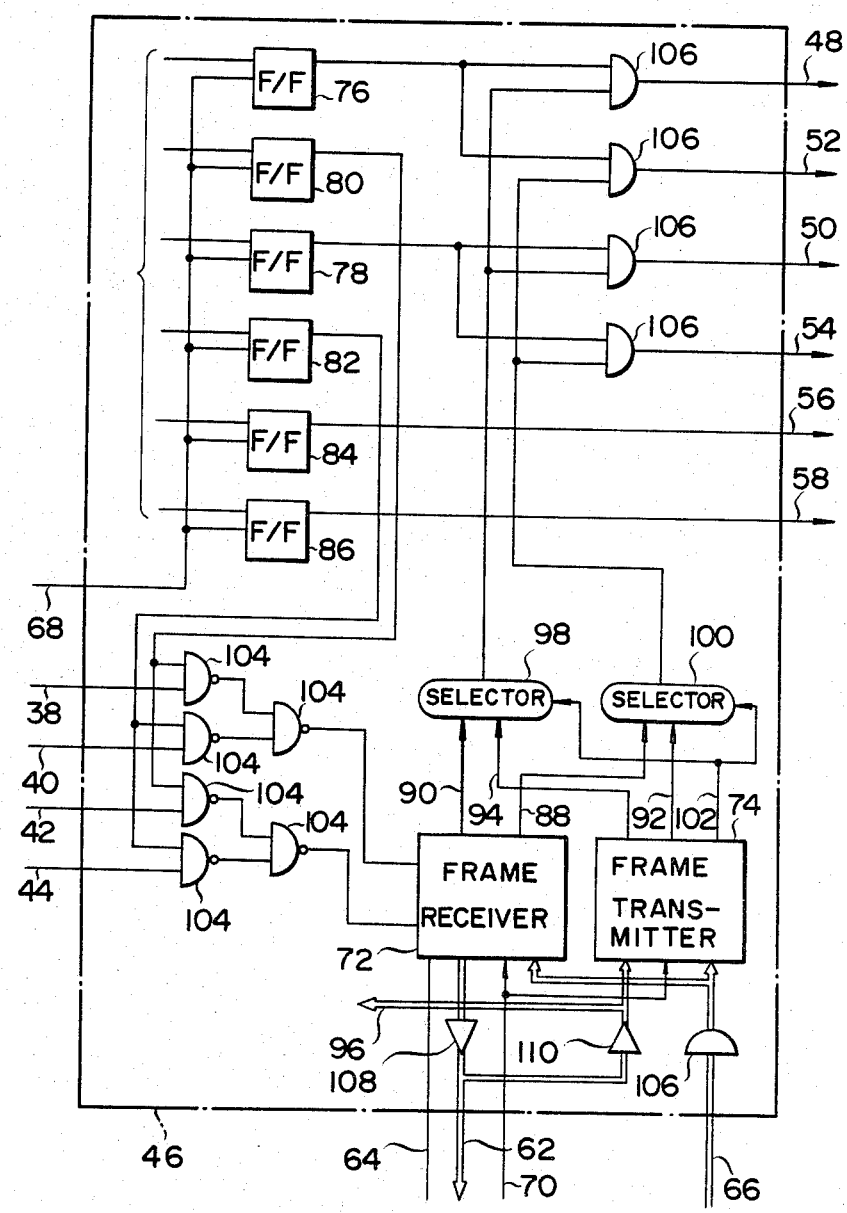
FIG. 3 is a diagram of a loop control circuit shown in FIG. 2.

Details of the loop control 46 are shown in FIG. 3. As shown, the loop control 46 includes a frame receive circuit 72 for receiving a frame, and a frame transmit circuit 74 for transmitting a frame in response to a request of the processor 60. Various flip-flops are included in the loop control 46; a flip-flop 76 showing that transmission to the first loop is enabled, a flip-flop 78 for showing that transmission to the second loop is enabled, a flip-flop 80 for showing that receipt from the first loop is enabled, a flip-flop 82 for showing that receipt from the second loop is enabled, a flip-flop 84 for delivering a bypass command to the first loop, and a flip-flop 86 for delivering a bypass command to the second loop. A through serial data line 88 (through which bit serial data entering the frame receive circuit 72 directly pass) extends from the frame receive circuit 72 to a selector 100, while a through clock line 90 (through which clock pulses entering the frame receive circuit 72 directly pass) extends from the frame receive circuit 72 to a second selector 98. A data line 92 is adapted to deliver bit serial data which are output from the frame transmit circuit 74, and a clock line 94 to deliver clock pulses output from the frame transmit circuit 74. A data line 95 is adapted to deliver part of data entering from the data bus 62. Further, a signal line 102 is adapted to convey a frame transmission request signal for selecting either one of the selectors 98 and 100. The device additionally includes NAND gates 104, AND gates 106, a driver 108 and a receiver 110.

Figure 4:
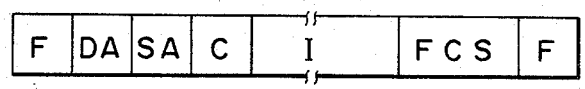
FIG. 4 is a format of a frame generally applicable to the present invention.

As shown in FIG. 4, a frame applicable to the present invention comprises a flag pattern F, "01111110", a destination address DA, a source address SA, control data C, information I to be tansmitted, and cyclic redundancy check bits FCS adapted to determine whether a frame has been properly transferred by the frame check sequence. The information I may be absent in the frame format.

The loop back system in accordance with the present invention will be operated as follows. Assume that the first loop, i.e., the paths 18, 20, 22 and 24, are active. In this condition, the transmission device 10 shown in FIG. 3 keeps its flip-flops 76, 80 and 86 set. The other transmission devices 12, 14, 16 shown in FIG. 1 are conditioned in the same manner as the transmission device 10 and individually connected to the first loop.

Let it be assumed that the transmission device 16 is monitoring the loops and controlling the system, and that an additional transmission device is to be installed between the existing transmission devices 10 and 12. First, the transmission device 16 supplies the transmission device 10 with a frame having a loop-back command (referred to as "loop-back comand A" hereinafter) in the format shown in FIG. 4. The loop-back command A connects the active loop to the receipt side and the backup loop to the transmission side. The frame is transmitted over the path 24 of FIG. 2 to be received by the frame receive circuit 72 shown in FIG. 3 by way of the first photoelectric transducer 34, clock line 38 and data line 42. The frame receive circuit 72 accepts the frame with the loop-back command A after confirming that the frame is meant for its own station (transmission device 10). The frame is not allowed to flow toward the downstream transmission device. In practive, an abort pattern "1111111100000000" is inserted into the frame.

Next, the transmission device 10 informs the processor 60 of the receipt of the frame by supplying an interrupt signal thereto via the interrupt line 64. In response to the interrupt signal, the processor 60 reads the information in the frame out of the frame receive circuit 72 and sees that the command is a loop-back command A. Then, the processor 60 sets the loop control 46 via the data bus 62 and by means of the write pulse 68 such that the transmission enable flip-flop 76 becomes on "on", the transmission enable flip-flop 78 becomes "on", the receipt enable flip-flop 80 becomes "on", the receipt enable flip-flop 82 becomes "off", and the bypass flip-flop 84 and 86 become "off". In this instance, the paths are in the same condition as when connected to the active loop and, therefore, data transfer between the transmission devices is possible.

Thereafter, the transmission device 16 transmits to the transmission device 12 a loop-back command (referred to as "loop-back command B" hereinafter) which conditions the backup path for receipt and the active path for transmission. Again, this frame has the format shown in FIG. 4. In the transmission device 10 through which the frame passes, the supplied frame is routed to the frame receive circuit 72 shown in FIG. 3. However, because this frame is not meant for the transmission device 10, it is directly applied to the clock line 90 and data line 88. Because the signal on the frame tansmission request line 102 extending from the frame receive 72 is low level, both the selectors 98 and 100 select the clock line 90 and data line 88 to route the frame of the loop-back command B to the clock lines 48 and 50 and data lines 52 and 54. As a result, the frame of the loop-back command B is sent out to the tansmission device 12 over the path 18 and 26. In the transmission device 12, the incoming frame reaches the photoelectric transducers 34 and 38.

However, the transmission device 12 at the above instant is capable of receiving data via the first loop only, that is, the flip-flop 80 shown in FIG. 3 is "on" and the flip-flop 82, "off". Under this condition, only the data delivered from the photoelectric transducer 34 is allowed to reach the frame receive circuit 72 of FIG. 3. The frame receive circuit 72 confirms that the frame is directed to the tansmission device 12 and accepts the frame of the loop-back command B. At the same time, the frame receive circuit 72 informs the processor 60 of the receipt of the frame via the interrupt line 64, thereby preventing the frame from being routed downstream transmission device.

Upon receipt of the signal on the interrupt line 64, the processor 60 reads of the content of the frame out of the frame receive circuit 72 and sees that the command is a loop-back command B. Then, the processor 60 actuates the loop control 46 via the data bus 62 and by means of the write pulse 68 such that the tansmission enable flip-flop 76 becomes "on", the transmission enable flip-flop 78 becomes "on", the receipt enable flip-flop 80 becomes "off", the receipt enable flip-flop 82 becomes "on", and the bypass flip-flops 84 and 86 become "off". The resulting looped back system condition is shown in FIG. 5.

Figure 5:
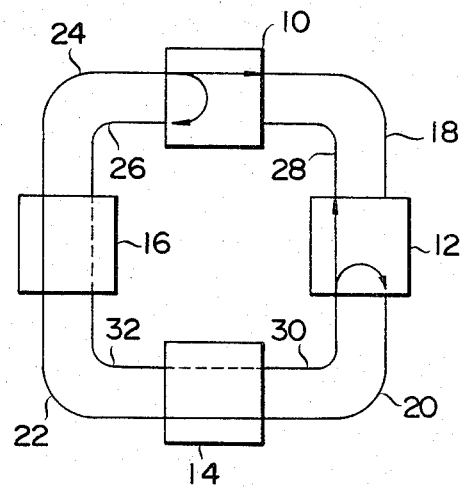
FIG. 5 is a diagram of transmission loops in a loop back condition in accordance with the present invention.

In FIG. 5, the arrows indicate directions in which clock and data flow. As shown, the transmission device 10 has the receiver side connecting to the first loop and the transmitter side to the first and second loops, while the transmission device 12 has the receiver side connecting to the second loop and the transmitter side to the first and second loops. The "bypass" herein referred to as implies the condition wherein, considering the photoelectric transducer 34, when the bypass line 56 is "on", the input to the photoelectric transducer 34 immediately leaves it as an output along a loop neglecting the transmission clock line 48 and transmission data line 52.

In the embodiment shown and described, the transmitter side of each transmission device is connected to the first and second loops without exception. Alternatively, a loop-back command may include an additional bit which specifies whether to send out data to both loops or to set up the usual loop-back (for example, in the case of the loop-back command A, the transmitter side is connected to the second loop and the receiver side to the first while, in the case of the loop-back command B, the transmitter side is connected to the first loop and the receiver side to the second). Further, each transmission device may be furnished with a flip-flop for determining whether to connect the transmitter side to both loops (including storing in a memory), so that data will be routed to both loops when the flip-flop is "on".

Although the frame receive circuit has been shown and described as being shared by the first and second loops, such is only illustrative and may be replaced by independent frame receive circuits which individually a frame from the second loop, the transmission side being connected to the first and second loops.

In summary, it will be seen that the present invention is capable of conditioning the whole system for a loop back mode of operation with a minimal number of hardware components and without interrupting the system operation, that is, in exactly the same manner as in ordinary data transfer. This advantage is attainable by connecting a transmission side of a transmission device to both a backup loop and an active loop upon receipt of a loop-back command.

Various modifications will become possible for those skilled in the art after receiving the teachings of the present disclosure without departing from the scope thereof.

What is claimed is:

1. A loop back system for a loop transmission line, comprising: an active loop and a backup loop which are paired for transmitting data;
   a plurality of transmission devices each being connected to said active loop and said backup loop for generating a loop-back command;
   first loop-back command transmission means for causing first one of the transmission devices to transmit a first loop-back command to second one of the transmission devices which is connected to the active loop and to be looped back, said second transmission device being located in the active loop, to which data is to be transmitted, downstream of and adjacent to said first transmission device;
   first loop-back means for looping back the second transmission device such that the second transmission device received the first loop-back command is turned back from the active loop to the backup loop while being kept in connection with the active loop;
   second loop-back command transmission means for causing the first transmission device to transmit a second loop-back command to third one of the transmission devices after the second transmission device is looped back by the first loop-back means, said third transmission device being located in the active loop downstream of and adjacent to the second transmission device; and
   second loop-back means for looping back said third transmission device such that the third transmission device received the second loop-back command is turned back from the backup loop to the active loop.

2. A loop back system as claimed in claim 1, in which the first and second loop-back command transmission means are commonly disposed in the first transmission device.

3. A loop back system as claimed in claim 1, in which in response to the first loop-back command a receiver side of the second transmission device is connected to the active loop and a transmitter side thereof is connected to both the active loop and the backup loop.

4. A loop back system as claimed in claim 3, in which in response to the second loop-back command a receiver side of the third transmission device is connected to the backup loop and a transmitter side thereof is connected to both the active loop and the backup loop.

* * * * *